United States Patent Office 3,784,574
Patented Jan. 8, 1974

3,784,574
HERBICIDAL N-FURFURYL SUBSTITUTED
2,6-DINITROANILINES
Lester L. Maravetz, Westfield, N.J., assignor to Esso
Research and Engineering Company
No Drawing. Original application Feb. 24, 1970, Ser. No. 18,407, now Patent No. 3,686,230. Divided and this application June 26, 1972, Ser. No. 268,220
Int. Cl. C07d 5/30
U.S. Cl. 260—347.7   2 Claims

ABSTRACT OF THE DISCLOSURE

The compounds of the subject invention are represented by the following generic formula

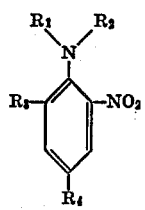

wherein $R_1$ is selected from the group consisting of

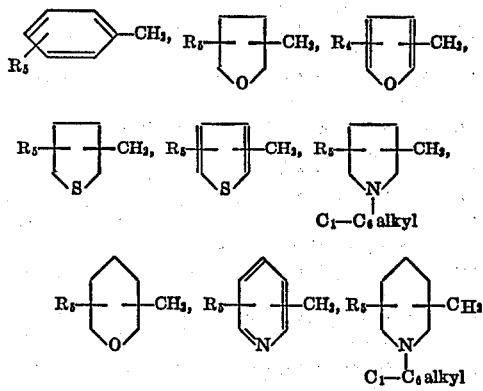

wherein $R_5$ is H; $C_1$–$C_6$ alkyl, alkenyl, haloalkyl, halogen, $NO_2$; $R_2$ is hydrogen, $C_1$–$C_6$ straight or branched chain alkyl, alkenyl, or alkynyl, $C_3$–$C_8$ cycloalkyl, $C_4$–$C_{10}$ cycloalkylalkyl, $C_1$–$C_6$ alkoxyalkyl, $C_1$–$C_6$ hydroxyalkyl, $C_1$–$C_6$ haloalkyl, $C_1$–$C_6$ cyanoalkyl, $C_2$–$C_6$ acylalkyl, $C_1$–$C_6$ alkylmercaptoalkyl, and related sulfoxide and sulfone analogs; $R_3$ is H, $NO_2$ halogen, $C_1$–$C_6$ alkyl; and $R_4$ is H, $C_1$–$C_6$ alkyl, haloalkyl, cycloalkyl, halogen, $CF_3$, $NO_2$, $C \equiv N$, $CH_3S(O)_x$, $C_2H_5S(O)_x$, $C_3H_7S(O)_x$, wherein $x$ is 0, 1 or 2, $SO_2NR_6R_7$ wherein $R_6$ and $R_7$ can be the same as $R_2$ or $R_6$ and $R_7$ when taken together with the nitrogen atom to which they are attached form a pyrrolidino, piperidino, aziridino, or morpholino ring.

This is a division of application Ser. No. 18,407, filed on Feb. 24, 1970, now U.S. Pat. 3,686,230.

This invention relates to derivatives of nitrated aniline compounds and their use as herbicides. In one aspect this invention relates to aryl and heterocyclic derivatives of nitrated aniline compounds as well as formulations and compositions thereof and their use as herbicides.

Alkyl derivatives of nitrated aniline compounds and their use as herbicides are well known in the art. For example, N,N-di-n-propyl-2,6-dinitro - 4 - trifluoromethyl-aniline, a commercial herbicide known in the art as Treflan, is disclosed in U.S. Pat. No. 3,257,190.

Moreover, sulfanilamides represented by the structure

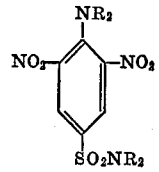

are disclosed in U.S. Pat. No. 3,367,949.

In a copending application, U.S. Ser. No. 749,326 filed on Aug. 1, 1968, now U.S. Pat. No. 3,546,295, cycloalkane derivatives of nitrated aniline compounds have been disclosed to be useful as herbicides.

The compounds of the subject invention are characterized by the following generic formula

wherein $R_1$ is one selected from the group consisting of

wherein $R_5$ is H, $C_1$–$C_6$ alkyl, alkenyl, haloalkyl, halogen, $NO_2$; $R_2$ is hydrogen, $C_1$–$C_6$ straight or branched chain alkyl, alkenyl or alkynyl, $C_3$–$C_8$ cycloalkyl, $C_4$–$C_{10}$ cycloalkylalkyl, $C_1$–$C_6$ alkoxyalkyl, $C_1$–$C_6$ hydroxyalkyl, $C_1$–$C_6$ haloalkyl, $C_1$–$C_6$ cyanoalkyl, $C_2$–$C_6$ acyl, $C_1$–$C_6$ alkylmercaptoalkyl; $R_3$ is hydrogen, $NO_2$, halogen, $C_1$–$C_6$ alkyl, and $R_4$ is hydrogen, $C_1$–$C_6$ alkyl, haloalkyl, cycloalkyl, halogen, $CF_3$, $NO_2$, $C \equiv N$, $CH_3S(O)_x$, $C_2H_5S(O)_x$, $C_3H_7S(O)_x$ wherein $x$ is 0, 1 or 2, $SO_2NR_6R_7$ wherein $R_6$ and $R_7$ can be the same as $R_2$, or $R_6$ and $R_7$ when taken with the nitrogen atom to which they are attached form a pyrrolidino, piperidino, aziridino, or morpholino ring.

Exemplary of nitrated aryl compounds which are encompassed by this invention are the following:

Compound No.:
1. N-tetrahydrofurfuryl-4-trifluoromethyl-2,6-dinitroaniline
2. N-methyl-N-tetrahydrofurfuryl-4-trifluoromethyl-2,6-dinitroaniline
3. N-ethyl-N-tetrahydrofurfuryl-4-trifluoromethyl-2,6-dinitroaniline
4. N-n-propyl-N-tetrahydrofurfuryl-4-trifluoromethyl-2,6-dinitroaniline
5. N-isobutyl-N-tetrahydrofurfuryl-4-trifluoromethyl-2,6-dinitroaniline Compound No.:
6 N-2-cyanoethyl-N-tetrahydrofurfuryl-4-trifluoromethyl-2,6-dinitroaniline
7 N-2-cyanopropyl-N-tetrahydrofurfuryl-4-trifluoromethyl-2,6-dinitroaniline
8 N-1-methyl-2-cyanoethyl-N-tetrahydrofurfuryl-4-trifluoromethyl-2,6-dinitroaniline
9 N-2-cyanoethyl-N-tetrahydrofurfuryl-2,6-dinitro-p-toluidine
10 N-ethyl-N-tetrahydrofurfuryl-2,6-dinitro-p-toluidine
11 N-n-propyl-N-tetrahydrofurfuryl-2,6-dinitro-p-toluidine
12 N-methyl-N-tetrahydrofurfuryl-2,6-dinitro-p-toluidine
13 N-n-propyl-N-tetrahydrofurfuryl-2,6-dinitroaniline
14 N-cyclopropyl-N-tetrahydrofurfuryl-4-trifluoromethyl-2,6-dinitroaniline
15 N-cyclopropylmethyl-N-tetrahydrofurfuryl-4-trifluoromethyl-2,6-dinitroaniline
16 N-cyclohexyl-N-tetrahydrofurfuryl-4-trifluoromethyl-2,6-dinitroaniline
17 N-2-chloroethyl-N-tetrahydrofurfuryl-4-trifluoromethyl-2,6-dinitroaniline
18 N-allyl-N-tetrahydrofurfuryl-4-trifluoromethyl-2,6-dinitroaniline
19 N-2-methoxyethyl-N-tetrahydrofurfuryl-4-trifluoromethyl-2,6-dinitroaniline
20 N-propargyl-N-tetrahydrofurfuryl-4-trifluoromethyl-2,6-dinitroaniline
21 N-2-hydroxyethyl-N-tetrahydrofurfuryl-4-trifluoromethyl-2,6-dinitroaniline
22 N-2-methylmercaptoethyl-N-tetrahydrofurfuryl-4-trifluoromethyl-2,6-dinitroaniline
23 N-acetonyl-N-tetrahydrofurfuryl-4-trifluoromethyl-2,6-dinitroaniline
24 N-n-propyl-N-tetrahydrofurfuryl-2-nitro-4-trifluoromethylaniline
25 N-ethyl-N-tetrahydrofurfuryl-2-nitro-4-trifluoromethyl-6-t-butylaniline
26 N-(2-methyl-2-tetrahydrofuryl)methyl-N-ethyl-4-trifluoromethyl-2,6-dinitroaniline
27 N-furfuryl-N-4-trifluoromethyl-2,6-dinitroaniline
28 N-furfuryl-N-methyl-2,6-dinitro-p-toluidine
29 N-methyl-N-tetrahydrofurfuryl-4-(methylsulfonyl)-2,6-dinitroaniline
30 N-ethyl-N-tetrahydrofurfuryl-4-(methylsulfonyl)-2,6-dinitroaniline
31 N-n-propyl-N-tetrahydrofurfuryl-4-(methylsulfonyl)-2,6-dinitroaniline
32 N-benzyl-N-methyl-4-trifluoromethyl-2,6-dinitroaniline
33 N-benzyl-N-ethyl-4-trifluoromethyl-2,6-dinitroaniline
34 N-benzyl-N-n-propyl-4-trifluoromethyl-2,6-dinitroaniline
35 N-benzyl-N-ethyl-2,6-dinitro-p-toluidine
36 N-benzyl-N-n-propyl-2,6-dinitro-p-toluidine
37 N-methyl-N-(2-picolyl)-4-trifluoromethyl-2,6-dinitroaniline
38 N-ethyl-N-(2-picolyl)-4-trifluoromethyl-2,6-dinitroaniline
39 N-ethyl-N-(3-picolyl)-4-trifluoromethyl-2,6-dinitroaniline
40 N-ethyl-N-(4-picolyl)-4-trifluoromethyl-2,6-dinitroaniline
41 N-ethyl-N-(2-picolyl)-4-(methylsulfonyl)-2,6-dinitroaniline
42 N-n-propyl-N-(2-picolyl)-4-(methylsulfonyl)-2,6-dinitroaniline
43 N-ethyl-N-(2-thenyl)-4-trifluoromethyl-2,6-dinitroaniline Compound No.:
44 N-ethyl-N-(2-thenyl)-4-(methylsulfonyl)-2,6-dinitroaniline
45 N-ethyl-N-(2-thenyl)-2,6-dinitro-p-toluidine
46 N-ethyl-N-(2-tetrahydrothenyl)-4-trifluoromethyl-2,6-dinitroaniline
47 N-n-propyl-N-(2-tetrahydrothenyl)-4-trifluoromethyl-2,6-dinitroaniline
48 N-methyl-N-(2-tetrahydropyranylmethyl)-4-trifluoromethyl-2,6-dinitroaniline
49 N-n-propyl-N-(2-tetrahydropyranylmethyl)-4-trifluoromethyl-2,6-dinitroaniline
50 N-ethyl-N-(2-tetrahydropyranylmethyl)-4-(methylsulfonyl)-2,6-dinitroaniline
51 N-methyl-N-(1-methyl-2-pyrrolidinylmethyl)-4-trifluoromethyl-2,6-dinitroaniline
52 N-ethyl-N-(1-methyl-2-piperidinylmethyl)-4-trifluoromethyl-2,6-dinitroaniline Other examples of this invention are compounds which have the following general formula:

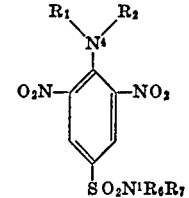

Compound No.:
53 3,5-dinitro-$N^4$-ethyl-$N^4$-tetrahydrofurfurylsulfanilamide
54 3,5-dinitro-$N^4$-n-propyl-$N^4$-tetrahydrofurfurylsulfanilamide
55 3,5-dinitro-$N^4$-isobutyl-$N^4$-tetrahydrofurfurylsulfanilamide
56 $N^1,N^1$-dimethyl-3,5-dinitro-$N^4$-ethyl-$N^4$-tetrahydrofurfurylsulfanilamide
57 3,5-dinitro-$N^4$-benzyl-$N^4$-ethylsulfanilamide
58 3,5-dinitro-$N^4$-benzyl-$N^4$-n-propylsulfanilimade
59 $N^1,N^1$-di-n-propyl-3,5-dinitro-$N^4$-methyl-$N^4$-benzylsulfanilamide
60 3,5-dinitro-$N^4$-methyl-$N^4$-(2-picolyl)sulfanilamide
61 3,5-dinitro-$N^4$-ethyl-$N^4$-(2-picolyl)sulfanilamide
62 3,5-dinitro-$N^4$-n-propyl-$N^4$-(2-picolyl)sulfanilamide
63 3,5-dinitro-$N^4$-ethyl-$N^4$-(3-picolyl)sulfanilamide
64 3,5-dinitro-$N^4$-ethyl-$N^4$-(4-picolyl)sulfanilamide
65 $N^1,N^1$-dimethyl-3,5-dinitro-$N^4$-ethyl-$N^4$-(2-picolyl)sulfanilamide
66 3,5-dinitro-$N^4$-methyl-$N^4$-furfurylsulfanilamide
67 3,5-dinitro-$N^4$-ethyl-$N^4$-(2-thenyl)sulfonilamide
68 3,5-dinitro-$N^4$-ethyl-$N^4$-(2-tetrahydrothenyl)sulfanilamide
69 3,5-dinitro-$N^4$-ethyl-$N^4$-(2-tetrahydropyranylmethyl)sulfanilamide
70 $N^1,N^1$-dimethyl-3,5-dinitro-$N^4$-methyl-$N^4$-(2-tetrahyropyranylmethyl)sulfanilamide
71 3,5-dinitro-$N^4$-ethyl-$N^4$-(1-methyl-2-pyrrolidinylmethyl)sulfonilamide The foregoing compounds can be readily prepared by the following synthetic methods. For example, the preferred method for preparation of these compounds comprises reaction of a highly reactive chloroaromatic such as

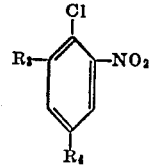

where the R groups have the same designation as previously described, with a primary or secondary amine in the presence of a tertiary amine such as triethylamine, tri--n-butylamine, N,N-dimethylaniline, etc. During reaction, elimination of HCl occurs and this reacts with the tertiary amine to form the corresponding amine hydrochloride salt.

Alternatively, an excess of the amine may be used to act as an HCl acceptor. Typical reaction conditions for the alternative methods of preparing compounds of this invention are given in Table I.

flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

TABLE I

| Method | Primary or secondary amine, moles | Tertiary amine, moles | Chloro-aromatic, moles | Temperature | Pressure, atm. | Solvents |
|---|---|---|---|---|---|---|
| 1(a) Preferred | 1.0–1.25 | 1.0–1.25 | 1.0 | 0 to 150° C. | 1 | Diethylether, petroleum ether, benzene, toluene, xylene, chlorinated hydrocarbons, ketones, alcohols. |
| 1(b) Broad | 1.0–1,000 | 1.0–1,000 | 1.0 | −25° C. to 300° C. | 0.1–1,000 | |
| 2(a) Preferred | 2.0–2,25 | 0 | 1.0 | 0 to 150° C. | 1 | |
| 2(b) Broad | 2.0–1,000 | 0 | 1.0 | −25° C. to 300° C. | 0.1–1,000 | |

Many of the amines utilized as precursors in the preparation of the herbicides of this invention are known in the literature.

The amines were synthesized either by the following disclosed methods or by other well established synthetic methods as illustrated hereinbelow.

(a) Reductive alkylation [See British Pat. 1,031,916; R. Paul and S. Tchelitcheff, Compt. rend. 221, 560–2, (1945)]

$$R\text{—}CHO + H_2NR' \xrightarrow[\text{Catalyst}]{H_2} RCH_2NHR'$$

(b) Addition of amines to $\alpha,\beta$-unsaturated nitriles $$RNH_2 + CH(R')=C(R'')\equiv N \longrightarrow RNHCH(R')\text{—}CH(R'')C\equiv N$$

(c) Displacement reactions $$RNH_2 + R'Br \xrightarrow{R''_3N} RNHR' + R''_3N\cdot HBr$$

In similar fashion the sulfonamide type compounds of this invention may be prepared by reaction of the substituted benzenesulfonylchloride $$\begin{array}{c} R_1\text{—}N\text{—}R_2 \\ R_3\text{—}\underset{\underset{SO_2Cl}{|}}{\bigcirc}\text{—}NO_2 \end{array}$$

with ammonia or amines of the type $R_6R_7NH$.

Any suitable organic solvent such as ether, petroleum ether, benzene, toluene, xylene, hexane, ketones, chlorinated hydrocarbons, etc. can be used in the method.

The compounds of the invention have general herbicidal properties. They are especially useful in certain types of weed control such as, for example, in application to crop lands to give control of the common weeds, without harming the crop plants; and for the control of crabgrass in lawns.

Herbicidal compositions of the inevntion are prepared by admixing one or more of the active ingredients defined heretofore, in herbicidally effective amounts with a conditioning agent of the kind used and referred to in the art as a pest control adjuvant or modifier to provide formulations adapted for ready and efficient application to soil or weeds (i.e., unwanted plants) using conventional applicator equipment.

Thus, the herbicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The herbicidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal compositions are applied either as a spray, granular or a dust to the locus or area to be protected from undesirable plant growth, commonly called weeds, i.e. plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal compositions of the invention for selective weed control as in the control of weeds in cotton or corn fields, the compositions are preferably applied after planting of the crop seeds but before emergence of the seedlings. In other words, the applications are of the pre-emergence type.

The active compound is, of course, applied in an amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray, dust or granular, will contain from about 0.1% to 100% by weight of the active compound.

Fertilizer materials, other herbicidal agents, and other pest control agents such as insecticides and fungicides can be included in the herbicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants or plant environment to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present nitrated aryl compounds.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

EXAMPLE 1

Prep. of N-n-propyl-N-tetrahydrofurfuryl-4-trifluoromethyl-2,6-dinitroaniline

A reaction flask was charged with N-n-propyltetrahydrofurfurylamine (3.3 g. of 0.023 mole), triethylamine (3.0 g., 0.03 mole) and benzene (125 ml.). To this stirred solution at room temperature was added dropwise a solution of 4-chloro-3,5-dinitrobenzotrifluoride (5.5 g., 0.02 mole) in benzene (30 ml.), over a period of 20 minutes. The resulting slurry was heated at reflux for five hours, cooled, and solid triethylamine hydrochloride was removed by filtration. The deep red colored filtrate was washed with water (50 ml.), 5% aqueous HCl (50 ml.), and water again (3× 50 ml.). The solvent was removed under reduced pressure and the residual viscous red oil weighed 6.8 g. This oil was identified by NMR spectroscopy and elemental analysis as N-n-propyl-N-tetrahydrofurfuryl-4-trifluoromethyl-2,6-dinitroaniline.

*Analysis.*—Calc. for $C_{15}H_{18}N_3O_5F_3$ (percent): C, 47.7; H, 4.80; N, 11.12. Found (percent): C, 47.2; H, 4.87; N, 11.17.

The compound of this example was formulated to provide a free-flowing emulsifiable concentrate adapted for dispersion in water for application as a herbicidal spray. The emulsifiable concentrate composition was made by intimately mixing the ingredients listed below using conventional mixing or blending equipment.

|  | Wt. percent |
|---|---|
| N-n-propyl-N-tetrahydrofurfuryl-4-trifluoromethyl-2,6-dinitroaniline | 45.8 |
| Sodium oleate | 10.0 |
| Xylene | 44.2 |

The formulation prepared as above is diluted with water and applied as a post-emergence application at a rate of 10 lbs. of the active aniline derivative compound per acre. The results are set forth in Table III.

EXAMPLE 2

Prep. of N-ethyl-N-tetrahydrofurfuryl-2,6-dinitro-p-toluidine

To a stirred solution of triethylamine (6.1 g., 0.06 mole), N-ethyltetrahydrofurfurylamine (7.1 g., 0.055 mole) and toluene (200 ml.) was added dropwise a solution of 4-chloro-3,5-dinitrotoluene (10.83 g., 0.05 mole) in 60 ml. of toluene. The resulting mixture was refluxed for 22 hours, cooled, and filtered to remove the by-product triethylamine hydrochloride salt. The filtrate was washed consecutively with water (100 ml.), 5% aqueous HCl (100 ml.) and water again (2× 100 ml.). Removal of the solvent under reduced pressure with warming gave the product N-ethyl-N-tetrahydrofurfuryl-2,6-dinitro-p-toluidine as a viscous red oil (14.2 g.).

*Analysis.*—Calc. for $C_{14}H_{19}N_3O_5$ (percent): C, 54.36; H, 6.19; N, 13.59. Found (percent): C, 53.77; H, 6.16; N, 13.10.

EXAMPLE 3

Prep. of N-benzyl-N-n-propyl-4-trifluoromethyl-2,6-dinitroaniline

As in the previous examples, a solution of 4-chloro-3,5-dinitrobenzotrifluoride (10.82 g., 0.04 mole) dissolved in 50 ml. of benzene was added dropwise to a stirred solution of N-n-propylbenzylamine (7.46 g., 0.05 mole) and triethylamine (7.07 g., 0.07 mole) in benzene (200 ml.). The mixture was refluxed for 19 hours and the usual workup gave an oil which upon standing crystallized to a solid. The products, N-benzyl-N-n-propyl-4-trifluoromethyl-2,6-dinitroaniline, upon recrystallization from petroleum ether gave a bright yellow solid (11.4 g.), M.P. 67.5–68.5° C.

*Analysis.*—Calc. for $C_{17}H_{16}N_3O_4F_3$ (percent): C, 53.40; H, 4.25; N, 11.0. Found (percent): C, 53.18; H, 4.38; N, 11.49.

EXAMPLE 4

Prep. of N-furfuryl-N-methyl-4-trifluoromethyl-2,6-dinitroaniline

A solution of 4-chloro-3,5-dinitrobenzotrifluoride (13.53 g., 0.05 mole) dissolved in 60 ml. of benzene was added dropwise to a solution of N-methylfurfurylamine (6.11 g., 0.055 mole) and triethylamine (7.07 g., 0.07 mole) in 200 ml. of benzene. The resulting mixture was refluxed for about 4 hours. Cooling of the solution, filtration of the triethylamine hydrochloride salt, and washing of the filtrate consecutively with 100 ml. portions of water, 5% aqueous HCl, and water again resulted in a clear red solution. Removal of solvent with warming under reduced pressure gave an oil which soon crystallized to a solid. Recrystallization of this solid from hot heptane gave the bright yellow product, M.P. 78–80° C.

*Analysis.*—Calc. for $C_{13}H_{10}N_3O_5F_3$ (percent): C, 45.30; H, 2.91; N, 12.20. Found (percent): C, 45.09; H, 3.28; N, 12.09.

EXAMPLE 5

Prep. of N-methyl-N-(2-picolyl)-4-trifluoromethyl-2,6-dinitroaniline 4-chloro-3,5-dinitrobenzotrifluoride (13.53 g., 0.05 mole) dissolved in 70 ml. of benzene was added dropwise to a stirred mixture of 2-picolylmethylamine (7.33 g., 0.06 mole) and triethylamine (7.07 g., 0.07 mole) in 200 ml. of benzene. After refluxing for 16 hours, the mixture was worked up in the same manner as previous examples except that the 5% aqueous HCl wash was omitted. The product was isolated as a green-colored material, M.P. 89–92° C.

*Analysis.*—Calc. for $C_{14}H_{11}N_4O_4F_3$ (percent): C, 47.20; H, 3.10; N, 15.70. Found (percent): C, 46.98; H, 3.17; N, 15.34.

EXAMPLE 6

Prep. of 4-(methylsulfonyl)-2,6-dinitro-N-ethyl-N-tetrahydrofurfurylaniline

A reaction flask was charged with 4-chloro-3,5-dinitrophenyl methylsulfone (28.1 g., 0.1 mole), triethylamine (11.1 g., 0.11 mole) and benzene (400 ml.). To this stirred solution was added dropwise a solution of N-ethyltetrahydrofurfurylamine (12.9 g., 0.1 mole) in 100 ml. of benzene. After the addition was complete, the resulting mixture was refluxed for 12 hours. Cooling of the mixture and filtration gave the triethylamine hydrochloride salt which was washed with a small amount of benzene. The combined filtrate and washings were washed with water (4× 50 ml.), dried over over anhhydrous $MgSO_4$ and stripped of solvent under reduced pressure. The residual oil crystalized upon standing and the solid was recrystallized from hot methanol. The resulting yellow product weighed 23.8 g., M.P. 112–14° C.

*Analysis.*—Calc. for $C_{14}H_{19}N_3O_7S$ (percent): C, 45.10; H, 5.14; N, 11.26. Found (percent): C, 44.92; H, 5.10; N, 11.25.

EXAMPLE 7

Prep. of 4-(methylsulfonyl)-2,6-dinitro-N-ethyl-N-(2-picolyl)aniline

A solution of 4-chloro-3,5-dinitrophenyl methylsulfone, (14.0 g., 0.05 mole), triethylamine (6.1 g., 0.06 mole) and methanol (120 ml.) was prepared. To this was added in 25 minutes with stirring 2-picolylethylamine (6.8 g., 0.05 mole). The resulting mixture was heated at reflux for 36 hours. After the mixture was cooled to approximately 0° C., the solid tan colored product which was filtered and washed with cold methanol melted at 177–8° C.

*Analysis.*—Calc. for $C_{15}H_{16}N_4O_6S$ (percent): C, 47.60; H, 4.24; N, 14.72. Found (percent): C, 47.28; H, 4.47; N, 14.82.

The foregoing specific examples give the general procedures utilized in preparing a host of other similar analogs, some of which are indicated here.

EXAMPLE 8

N-n-propyltetrahydrofurfurylamine was reacted with 4-chloro-3,5-dinitrotoluene to give an oil, N-n-propyl-N-tetrahydrofurfuryl-2,6-dinitro-p-toluidine.

*Analysis.*—Calc. for $C_{15}H_{21}N_3O_5$ (percent): N, 13.00. Found (percent): N, 12.47.

EXAMPLE 9

N-ethyltetrahydrofurfurylamine was reacted with 4-chloro-3,5-dinitrobenzotrifluoride to give a solid (M.P. 63–66° C.), N-ethyl-N-tetrahydrofurfuryl-4-trifluoromethyl-2,6-dinitroaniline.

*Analysis.*—Calc. for $C_{14}H_{16}N_3O_5F_3$ (percent): N, 11.58. Found (percent): N, 11.70.

The compound of this example was formulated to provide a free-flowing emulsifiable concentrate adapted for dispersion in water for application as a herbicidal spray. The emulsifiable concentrate composition is made by intimately mixing the ingredients listed below using conventional mixing or blending equipment.

| | Wt. percent |
|---|---|
| N-ethyl-N-tetrahydrofurfuryl-4-trifluoromethyl-2,6-dinitroaniline | —24.2 |
| Cyclohexanone | 24.2 |
| Sodium oleate | 7.5 |
| A sulfonated fish oil | 2.5 |
| Xylene | 41.6 |

EXAMPLE 10

N-methylfurfurylamine was reacted with 4-chloro-3,5-dinitrotoluene to give a solid (M.P. 66.5–67° C.), N-furfuryl-N-methyl-2,6-dinitro-p-toluidine.

*Analysis.*—Calc. for $C_{13}H_{13}N_3O_5$ (percent): N, 14.43. Found (percent): N, 14.43.

EXAMPLE 11

Tetrahydrofurfurylamine was reacted with 4-chloro-3,5-dinitrobenzotrifluoride to give a solid (M.P. 60–62° C.), N-tetrahydrofurfuryl-4-trifluoromethyl-2,6-dinitroaniline.

*Analysis.*—Calc. for $C_{12}H_{12}N_3O_5F_3$ (percent): N, 12.55. Found (percent): N, 12.79.

EXAMPLE 12

N-methyltetrahydrofurfurylamine was reacted with 4-chloro-3,5-dinitrobenzotrifluoride to give a solid (M.P. 50–51° C.), N-methyl-N-tetrahydrofurfuryl-4-trifluoromethyl-2,6-dinitroaniline.

*Analysis.*—Calc. for $C_{13}H_{14}N_3O_5F_3$: (percent): N, 12.03. Found (percent): N, 12.32.

EXAMPLE 13

N-methyltetrahydrofurfurylamine was reacted with 4-chloro-3,5-dinitrotoluene to give a solid (M.P. 29–30° C.), N-methyl-N-tetrahydrofurfuryl-2,6-dinitro-p-toluidine.

*Analysis.*—Calc. for $C_{13}H_{17}N_3O_5$ (percent): N, 14.23. Found (percent): N, 14.30.

EXAMPLE 14

N-ethylbenzylamine was reacted with 4-chloro-3,5-dinitrotoluene to give a solid (M.P. 61–64° C.) N-benzyl-N-ethyl-2,6-dinitro-p-toluidine.

*Analysis.*—Calc. for $C_{16}H_{17}N_3O_4$ (percent): N, 13.35. Found (percent): N, 13.53.

EXAMPLE 15

N-ethylbenzylamine was reacted with 4-chloro-3,5-dinitrobenzotrifluoride to give N-benzyl-N-ethyl-4-trifluoromethyl-2,6-dinitroaniline (M.P. 57–60° C.).

*Analysis.*—Calc. for $C_{16}H_{14}N_3O_4F_3$ (percent): N, 11.44. Found (percent): N, 11.44.

EXAMPLE 16

N-methylbenzylamine was reacted with 4-chloro-3,5-dinitrobenzotrifluoride to give N-benzyl-N-methyl-4-trifluoromethyl-2,6-dinitroaniline (M.P. 90–93° C.).

*Analysis.*—Calc. for $C_{15}H_{12}N_3O_4F_3$ (percent): N, 11.82. Found (percent): N, 11.52.

EXAMPLE 17

2-picolyl-n-propylamine was reacted with 4-chloro-3,5-dinitrophenyl methylsulfone to give a solid (M.P. 153–55° C.), 4-(methylsulfonyl)-2,6-dinitro-N-n-propyl-N-(2-picolyl) aniline.

*Analysis.*—Calc. for $C_{16}H_{18}N_4O_6S$ (percent): N, 14.22. Found (percent): N, 14.55.

EXAMPLE 18

N-n-propyltetrahydrofurfurylamine was reacted with 4-chloro - 3,5 - dinitrophenyl methylsulfone to give a solid (M.P. 138–39° C.), 4-(methylsulfonyl)-2,6-dinitro-N-n-propyl-N-tetrahydrofurfurylaniline.

Analysis.—Calc. for $C_{15}H_{21}N_3O_5S$ (percent): N, 10.84. Found (percent): N, 10.70.

EXAMPLE 19

N-isobutyltetrahydrofurfurylamine was reacted with 4-chloro-3,5-dinitrobenzotrifluoride to give a solid (M.P. 98–99.5° C.), N - isobutyl-N-tetrahydrofurfuryl-4-trifluoromethyl-2,6-dinitroaniline.

Analysis.—Calc. for $C_{16}H_{20}N_3O_5F_3$ (percent): N, 10.74. Found (percent): N, 10.63.

EXAMPLE 20

N-2-cyanopropyltetrahydrofurfurylamine was reacted with 4-chloro-3,5-dinitrobenzotrifluoride to give a solid (M.P. 101–103° C.), N-2-cyanopropyl-N-tetrahydrofurfuryl-4-trifluoromethyl-2,6-dinitroaniline.

Analysis.—Calc. for $C_{16}H_{17}N_4O_5F_3$ (percent): N, 13.91. Found (percent): N, 13.85.

Still a further modification of this invention encompasses compounds of the following general formula:

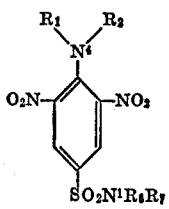

These compounds may be prepared by reaction of the corresponding 3,5 - dinitro-4-[N,N-disubstituted amino] benzenesulfonyl chloride with ammonia, ammonium hydroxide, or selected amines of the general type $R_6R_7NH$.

Some examples of this type of compound are given here.

EXAMPLE 21

3,5-dinitro-$N^4$-benzyl-$N^4$-ethylsulfanilamide.

Analysis.—Calc. for $C_{15}H_{16}N_4O_6S$ (percent): N, 14.68. Found (percent): N, 14.58.

EXAMPLE 22

3,5 - dinitro-$N^4$-benzyl-$N^4$-n-propylsulfanilamide, (M.P. 163–6° C.—decomposes).

Analysis.—Calc. for $C_{16}H_{18}N_4O_6S$ (percent): N, 14.25. Found (percent): N, 14.26.

EXAMPLE 23

3,5-dinitro - $N^4$ - methyl-$N^4$-(2-picolyl) sulfanilamide, (M.P. 191–92.5° C.—decomposes).

Analysis.—Calc. for $C_{13}H_{13}N_5O_6S$ (percent): N, 19.05. Found (percent): N, 18.44.

EXAMPLE 24

3,5-dinitro - $N^4$ - n-propyl-$N^4$-(2-picolyl)sulfanilamide (M.P. 95–8° C.—decomposes).

Analysis.—Calc. for $C_{15}H_{17}N_5O_6S$ (percent): N, 17.71. Found (percent): N, 18.02.

EXAMPLE 25

3,5-dinitro - $N^4$ - ethyl-$N^4$-tetrahydrofurfurylsulfanilamide.

Analysis.—Calc. for $C_{13}H_{18}N_4O_7S$ (percent): N, 14.98. Found (percent): N, 14.64.

EXAMPLE 26

3,5 - dinitro-$N^4$-n-propyl-$N^4$-tetrahydrofurfurylsulfanilamide (M.P. 49–50° C.).

Analysis.—Calc. for $C_{14}H_{20}N_4O_7S$ (percent): N, 14.42. Found (percent): N, 13.35.

EXAMPLE 27

Representative nitrated aryl derivatives from those prepared in the previous examples were evaluated for pre-emergence herbicidal activity in this example. The test procedure employed was as follows:

Two flats seeded with six crops (cotton, soybean, alfalfa, corn, rice and oats) and six weeds (mustard, morning glory, crabgrass, foxtail, barnyard grass and zinnia) were sprayed with a formulation containing the test chemical at a rate equivalent to 5 lbs./acre. The test chemicals were sprayed as acetone solutions or very small particle acetone suspensions onto the test plants. Sprayers were calibrated to deliver a certain volume of liquid and the calculated amount of active ingredient which would give a rate corresponding to the indicated lbs./acre. The flats were then held in the greenhouse and a response rated after 12 days to 16 days. Response was rated by a scale of 0–10. The 0–10 scale is defined as: 0=no injury; 1–3=slight injury; 4–6=moderate injury, plants may die; 7–9=severe injury, plants will probably die; 10=all plants dead (complete kill). Results of this test are shown below in Table II and it is indicative that many of these compounds show a high degree of herbicidal activity against certain weed species, yet remain highly tolerant of desirable crop species.

TABLE II.—PREEMERGENCE HERBICIDAL ACTIVITY
Rate=5 lb./acre
[Rating 0-10: 0=no effect; 10=complete kill. H=hormonal effect; S=stunting; F=formative effect]

| Compounds | | | | Barnyard grass | Crabgrass | Foxtail | Zinnia | Mustard | Morning glory | Cotton | Soybean | Alfalfa | Corn | Rice | Oats |
| $R_4$ | $R_3$ | $R_1$ | $R_2$ | | | | | | | | | | | | |
| --- | --- | --- | --- | --- | --- | --- | --- | --- | --- | --- | --- | --- | --- | --- | --- |
| $CF_3$ | $NO_2$ | —CH₂―O (tetrahydrofurfuryl) | $CH_3$ | 9S | 9S | 8S | 0 | 0 | 1 | 0 | 0 | 2 | 0 | 0 | 0 |
| $CF_3$ | $NO_2$ | Same as above | $C_2H_5$ | 10 | 10 | 10 | 3F | 8FS | 6F | 1F | 2S | 8FS | 2F | 8 | 2F |
| $CF_3$ | $NO_2$ | do | n-$C_3H_7$ | 10 | 10 | 10 | 6FS | 2 | 0 | 0 | 0 | 2FS | 0 | 0 | 0 |
| $CF_3$ | $NO_2$ | do | $CH_2CH(CH_3)_2$ | 8S | 9S | 9S | 3S | 2 | 0 | 0 | 0 | 0 | 0 | 1S | 0 |
| $CF_3$ | $NO_2$ | do | $CH_2CH_2=N$ | 4S | 7S | 8S | 2 | 0 | 0 | 0 | 2 | 3 | 2 | 2S | 2 |
| $CF_3$ | $NO_2$ | do | $CH_2CH(CH_3)C=N$ | 6S | 9S | 8S | 5 | 3 | 0 | 0 | 0 | 0 | 0 | 3S | 2S |
| $CH_3$ | $NO_2$ | do | $C_2H_5$ | 9HS | 9HS | 9HS | 7F | 2F | 2FS | 0 | 0 | 0 | 0 | 6 | 0 |
| $CH_3$ | $NO_2$ | do | n-$C_3H_7$ | 9HS | 9S | 8HS | 1 | 2S | 1F | 0 | 0 | 0 | 0 | 0 | 0 |
| $CH_3$ | $NO_2$ | do | $CH_3$ | 9S | 7S | 4 | 1 | 1 | 0 | 0 | 0 | 1 | 0 | 0 | 0 |
| $CF_3$ | $NO_2$ | —CH₂―O (tetrahydrofurfuryl) | $CH_3$ | 6S | 8S | 7S | 2 | 2 | 1 | 0 | 2 | 2 | 0 | 3S | 3S |
| $CH_3$ | $NO_2$ | Same as above | $CH_3$ | 4S | 5S | 2S | 8 | 2 | 4 | 0 | 0 | 1 | 0 | 0 | 0 |

TABLE II—Continued

| Compounds | | | | Barn-yard grass | Crab-grass | Fox-tail | Zin-nia | Mus-tard | Morn-ing glory | Cot-ton | Soy-bean | Al-fal-fa | Corn | Rice | Oats |
|---|---|---|---|---|---|---|---|---|---|---|---|---|---|---|---|
| R4 | R3 | R1 | R2 | | | | | | | | | | | | |
| CH₃SO₂ | NO₂ | 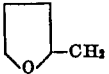 | CH₃ | 2 | 8S | 7S | 1 | 1 | 2 | 4 | 6 | 3 | 6 | 5S | 4S |
| CH₃SO₂ | NO₂ | Same as above | C₂H₅ | 9S | 10 | 9S | 2S | 3S | 2 | 0 | 0 | 1 | 0 | 10 | 2 |
| CH₃SO₂ | NO₂ | ...do | n-C₃H₇ | 8S | 9S | 9S | 2 | 0 | 0 | 0 | 0 | 2S | 0 | 8S | 0 |
| CF₃ | NO₂ |  | CH₃ | 8S | 8S | 8S | 0 | 0 | 0 | 0 | 0 | 0 | 0 | 0 | 0 |
| CF₃ | NO₂ | 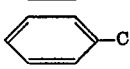 | C₂H₅ | 9S | 9S | 9S | 4S | 3 | 2 | 2 | 0 | 1 | 0 | 0 | 0 |
| CF₃ | NO₂ | Same as above | n-C₃H₇ | 8S | 9S | 9S | 3 | 2 | 2 | 1 | 0 | 1 | 0 | 0 | 0 |
| CH₃ | NO₂ | ...do | C₂H₅ | 8S | 8S | 7S | 2 | 3 | 2 | 1 | 1 | 2 | 0 | 0 | 0 |
| CH₃ | NO₂ | ...do | n-C₃H₇ | 6S | 8S | 7S | 1 | 0 | 0 | 0 | 0 | 0 | 0 | 0 | 0 |
| CF₃ | NO₂ | 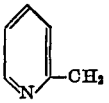 | CH₃ | 9S | 8S | 9S | 1 | 2 | 1 | 0 | 0 | 0 | 0 | 0 | 0 |
| CF₃ª | NO₂ | Same as above | C₂H₅ | 8S | 8S | 8S | 8 | 8 | 2 | 0 | 0 | 0 | 0 | 0 | 0 |
| CH₃SO₂ | NO₂ | ...do | n-C₃H₇ | 5S | 9S | 8S | 3 | 2 | 0 | 0 | 8 | 3S | 0 | 8S | 0 |

| Compounds | | | | Barn-yard grass | Crab-grass | Fox-tail | Zin-nia | Mus-tard | Morn-ing glory | Cot-ton | Soy-bean | Alfalfa | Corn | Rice | Oats |
|---|---|---|---|---|---|---|---|---|---|---|---|---|---|---|---|
| R1 | R2 | R6 | R7 | | | | | | | | | | | | |
| 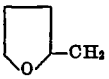 | C₂H₅ | H | H | 9S | 10 | 9S | 0 | 2S | 2 | 0 | 0 | 2S | 0 | 9S | 4S |
| Same as above | n-C₃H₇ | H | H | 9S | 9S | 9S | 0 | 0 | 1S | 0 | 0 | 3S | 0 | 6S | 2S |
| Do | CH₂CH(CH₃)₂ | H | H | 4S | 5S | 5S | 0 | 0 | 0 | 0 | 0 | 0 | 0 | 1S | 0 |
|  | C₂H₅ | H | H | 6S | 7S | 5S | 0 | 0 | 0 | 0 | 0 | 1S | 0 | 4S | 1S |
| 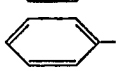 | n-C₃H₇ | H | H | 6S | 7S | 6S | 2 | 3 | 0 | 0 | 0 | 2S | 0 | 4S | 0 |
| 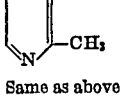 | CH₃ | H | H | 2S | 5S | 3S | 2 | 2 | 1 | 1 | 1 | 2 | 0 | 4S | 1 |
| Same as above | C₂H₅ | H | H | 9S | 9S | 7S | 1 | 1 | 0 | 2 | 1 | 0 | 0 | 2S | 0 |
| Do | n-C₃H₇ | H | H | 4S | 6S | 6S | 0 | 0 | 1 | 0 | 0 | 0 | 0 | 1S | 0 |

ª 2.5 lbs./acre.

EXAMPLE 28

In this example representative derivatives of the nitrated aryl compounds of this invention were evaluated for post-emergence activity. The test procedure was as follows:

Flats were seeded, as described in the previous example, and held until the first true leaves had appeared on all plants, which were then sprayed in the same fashion as in the preceding example at a rate of 10 lbs./acre. The plant responses were rated 12–16 days after treatment on the same scale as described previously. The test results are shown in Table III.

TABLE III.—POST-EMERGENCE HERBICIDAL ACTIVITY

Rate=10 lbs./acre

[Rating 0–10: 0=no effect; 10=complete kill. H=hormonal effect; S=stunting; F=formative effect]

| Compounds | | | | Barn-yard grass | Crab-grass | Fox-tail | Zinnia | Mus-tard | Morn-ing glory | Cot-ton | Soy-bean | Al-falfa | Corn | Rice | Oats |
|---|---|---|---|---|---|---|---|---|---|---|---|---|---|---|---|
| R4 | R3 | R1 | R2 | | | | | | | | | | | | |
| CF₃ | NO₂ | 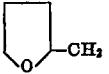 | H | 6 | 10 | 8 | 6 | 10 | 7 | 0 | 0 | 4 | 1 | 4 | 5 |
| CF₃ | NO₂ | Same as above | CH₃ | 5 | 6 | 6 | 7 | 8 | 3 | | | | | | |
| CF₃ | NO₂ | ...do | C₂H₅ | 7F | 7F | 4F | 3F | 3F | 2F | | | | | | |
| CF₃ | NO₂ | ...do | n-C₃H₇ | 8F | 6F | 2F | 3F | 3F | 4F | | | | | | |
| CH₃ | NO₂ | ...do | C₂H₅ | 7HF | 9HF | 9HF | 4F | 3F | 4F | 1 | 3 | 2 | 1 | 1 | 1 |
| CH₃ | NO₂ | ...do | n-C₃H₇ | 7F | 8F | 6F | 8F | 5F | 4F | 4F | 3F | 3F | 2 | 0 | 3F |
| CH₃ | NO₂ | ...do | CH₃ | 5F | 5F | 6H | 2H | 3H | 4F | | | | | | |
| CF₃ | NO₂ | 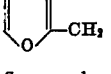 | CH₃ | 3H | 5H | 3 | 7F | 5F | 2F | 3F | 2F | 2 | 2 | 1 | 2 |
| CH₃ | NO₂ | Same as above | CH₃ | 8 | 10 | 4 | 7 | 5 | 4 | 0 | 0 | 0 | 0 | 2 | 2 |

What is claimed is:
1. A compound of the formula
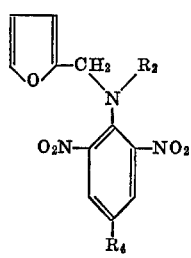
wherein $R_2$ is $C_1$–$C_4$ alkyl and $R_4$ is methyl or trifluoromethyl.
2. A compound according to claim 1 which is N-furfuryl-N-methyl-4-trifluoromethyl-2,6-dinitroaniline.
References Cited
UNITED STATES PATENTS
3,194,818   7/1965   Clarke _____ 260—347.7
DONALD G. DAUS, Primary Examiner
B. DENTZ, Assistant Examiner